United States Patent
Okada (10) Patent No.: US 9,055,204 B2
(45) Date of Patent: Jun. 9, 2015

(54) IMAGE CAPTURE DEVICE WITH NETWORK CAPABILITY AND COMPUTER PROGRAM

(71) Applicant: Panasonic Corporation, Osaka (JP)

(72) Inventor: Takanori Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 77 days.

(21) Appl. No.: 13/760,205

(22) Filed: Feb. 6, 2013

(65) Prior Publication Data
US 2013/0235215 A1 Sep. 12, 2013

(30) Foreign Application Priority Data

Mar. 9, 2012 (JP) .................................. 2012-052663
Oct. 12, 2012 (JP) .................................. 2012-226662

(51) Int. Cl.
*H04N 1/00* (2006.01)
*H04N 1/21* (2006.01)
*H04N 5/225* (2006.01)
*H04N 5/77* (2006.01)
*G06F 3/00* (2006.01)
*H04N 5/765* (2006.01)
*H04N 5/907* (2006.01)
*H04N 21/274* (2011.01)
*H04N 21/418* (2011.01)
*H04N 21/4223* (2011.01)
*H04N 21/433* (2011.01)

(52) U.S. Cl.
CPC .............. *H04N 1/2158* (2013.01); *G06F 3/005* (2013.01); *H04N 1/00095* (2013.01); *H04N 1/00127* (2013.01); *H04N 5/225* (2013.01); *H04N 5/77* (2013.01); *H04N 5/765* (2013.01); *H04N 5/772* (2013.01); *H04N 5/907* (2013.01); *H04N 21/274* (2013.01); *H04N 21/4184* (2013.01); *H04N 21/4223* (2013.01); *H04N 21/4334* (2013.01)

(58) Field of Classification Search
None
See application file for complete search history.

(56) References Cited

U.S. PATENT DOCUMENTS

| | | | |
|---|---|---|---|
| 2001/0017653 | A1 | 8/2001 | Hata |
| 2004/0017490 | A1* | 1/2004 | Lin ........................... 348/231.99 |
| 2004/0208490 | A1* | 10/2004 | Akutsu et al. ................. 386/117 |
| 2007/0058053 | A1* | 3/2007 | Shimizu ..................... 348/231.99 |
| 2009/0122153 | A1* | 5/2009 | Fukui ........................ 348/222.1 |
| 2010/0197348 | A1* | 8/2010 | Kojima ........................ 455/558 |
| 2011/0115935 | A1* | 5/2011 | Myung ....................... 348/222.1 |

FOREIGN PATENT DOCUMENTS

JP 2001-238160 A 8/2001

* cited by examiner

*Primary Examiner* — Justin P Misleh
(74) *Attorney, Agent, or Firm* — Renner, Otto, Boiselle & Sklar, LLP (57) ABSTRACT

An image capture device as an embodiment of the present disclosure includes: an image capturing section configured to generate video data by performing an image capturing session; a first interface that is connectable to a first storage medium; a second interface that is connectable to a second storage medium; a network interface configured to transmit and receive data by connecting itself to a network; and a controller configured to control writing the video data on the first and second storage media so that if the image capturing section's image capturing session overlaps with transmission of the video data from the first storage medium over the network via the network interface, the video data that has been generated as a result of the image capturing session is written on the second storage medium.

8 Claims, 10 Drawing Sheets

| ORDER OF PRIORITY | CLIP NAME | STARTING POINT ~ END POINT | TARGET STORAGE MEDIUM |
|---|---|---|---|
| 1 | Video1 | 01:00:33.00 ~ 01:12:24.00 | Device A |
| 2 | Video2 | 00:52:10.00 ~ 00:53:38.00 | Device B |
| 3 | Video3 | 02:13:54.00 ~ 02:18:05.00 | Device A |

FIG.12

IMAGE CAPTURE DEVICE WITH NETWORK CAPABILITY AND COMPUTER PROGRAM

BACKGROUND

1. Technical Field

The present disclosure relates to an image capture device with a network capability.

2. Description of the Related Art

An image capture device which not only reads and writes a moving picture but also has a network capability is known.

Japanese Laid-Open Patent Publication No. 2001-238160 discloses an example in which an image capture device is connected to the Internet using its network capability. Such an image capture device can not only play back video shot but also transmit it over a network. With such an image capture device, video that has been shot on the spot can be viewed and listened to at a distant location over the Internet.

SUMMARY

If the image capture device disclosed in Japanese Laid-Open Patent Publication No. 2001-238160 needs to newly record a video while transmitting the other video shot over a network, a problem arises. That is to say, if the image capture device needs to newly start a write operation while reading video data from a storage medium, the storage medium should have high capabilities to accept reading and writing simultaneously (which will be referred to herein as "simultaneous read/write capabilities"). Particularly, the higher the bit rate of the video data, the higher the transfer ability of the storage medium should be to provide the simultaneous read/write capabilities. As a result, the cost of such a storage medium or its peripheral hardware rises, which is a problem. Meanwhile, if an image capture device that can write only on a storage medium with no simultaneous read/write capabilities is used to cut down the costs, then such a device cannot write data on that storage medium while transmitting video shot from the storage medium over a network at the same time.

One non-limiting, and exemplary embodiment provides an image capture device which can still write video data on a storage medium while transmitting another video data over a network even if the storage medium used does not have high capabilities to accept reading and writing simultaneously.

In one general aspect, an image capture device disclosed herein includes: an image capturing section configured to generate video data by performing an image capturing session; a first interface that is connectable to a first storage medium; a second interface that is connectable to a second storage medium; a network interface configured to transmit and receive data by connecting itself to a network; and a controller configured to control writing the video data on the first and second storage media so that if the image capturing section's image capturing session overlaps with transmission of the video data from the first storage medium over the network via the network interface, the video data that has been generated as a result of the image capturing session is written on the second storage medium.

According to the above aspect, it is possible to perform image capturing and write operations while transmitting the video data at the same time, thus providing a handier image capture device. In addition, even if the image capture device needs to handle video data at a high bit rate, the costs of a storage medium and peripheral hardware can be cut down as well.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will sometimes be omitted, so will be a redundant description of substantially the same configuration. This is done solely for the purpose of avoiding redundancies and making the following description of embodiments as easily understandable for those skilled in the art as possible.

It should be noted that the present inventors provide those skilled in the art with the accompanying drawings and the following description to help them fully understand the present disclosure. And it is not intended that the subject matter defined by the appended claims is limited by those drawings or the description.

First of all, the basic idea of an image capture device as an embodiment of the present disclosure will be described with reference to FIGS. 1 through 4.

An image capture device according to the present disclosure may be, for example, a camcorder for professional use, which may be used on the spot to record video, which will eventually be edited and broadcast in a news report. Such an image capture device can transmit the video that has been shot on the spot to either a distant broadcasting station or a data center over a network.

Figure 1:
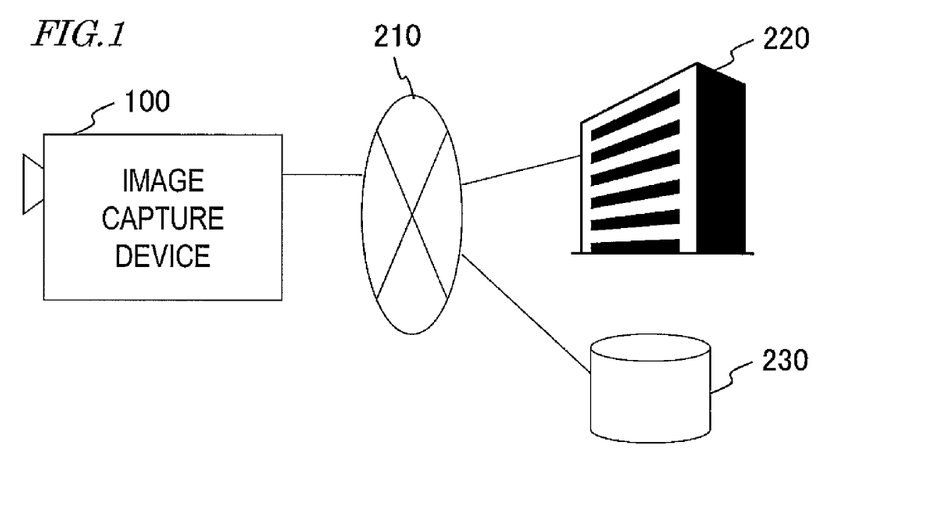
FIG. 1 illustrates an exemplary architecture for a network to which an image capture device according to the present disclosure is connected.

FIG. 1 illustrates how an image capture device 100 is connected to a broadcasting station 220 and a server 230 over a network 210. The image capture device 100 can transmit video data to either an in-house network in the broadcasting station 220 or a server 230 at a distant location over the network 210. In this description, the network 210 is any arbitrary kind of telecommunications network. Examples of such a network include the Internet, a dedicated line, and a local area network (LAN). Also, the network 210 does not have to be a wired network but may also be a wireless network as well. In the following description, the image capture device's (100) operation of transmitting data over the network 210 will be referred to herein as "network transmission".

The video that has been shot and recorded by the image capture device 100 may be broadcast as it is in some cases. That is why such video needs to be of high quality, which means that the video has such a huge data size that it may take a long time to transmit it completely. For example, if video data with a bitrate of 100 megabits per second (Mbps) and with a length of 100 seconds needs to be transmitted, and if the transfer rate of a network is 100 Mbps, then it will take as long as 100 seconds to transmit the data of such a huge size completely. And even if the transfer rate is 1 Gbps, it will still take 10 seconds to finish transmitting it.

Unless a storage medium connected to the image capture device 100 has simultaneous read/write capabilities, no new data can be written on the storage medium while data is being read from the storage medium for network transmission. For that reason, if high quality video data of a huge data size needs to be transmitted, the user has to wait so long until the device is ready to write video data again that he or she is likely to miss a golden opportunity to shoot a suddenly occurring important scene. On the other hand, if data that has already been written on a storage medium has to be transmitted while video data is being written on that storage medium, transmission of the former data has to either wait until the latter data is written completely or be started by stopping writing the latter data. In any case, it is impossible to transmit the former data and write the latter data at the same time.

If the storage medium connected to the image capture device 100 and the peripheral hardware had simultaneous read/write capabilities, such a problem would never arise. However, it would be far from being a cost-effective measure to take to require the storage medium and peripheral hardware to have such high capabilities.

Thus, in order to overcome such a problem, if data needs to be written on a storage medium while another data is being transmitted over the network 210, the image capture device 100 according to an embodiment of the present disclosure is controlled so as not to write and read data on/from a particular storage medium simultaneously. By taking such a measure, even if the storage medium and peripheral hardware do not have simultaneous read/write capabilities, data can be transmitted while another data is being written, and vice versa.

Hereinafter, the configuration and operation of this image capture device 100 will be outlined.

Figure 2:
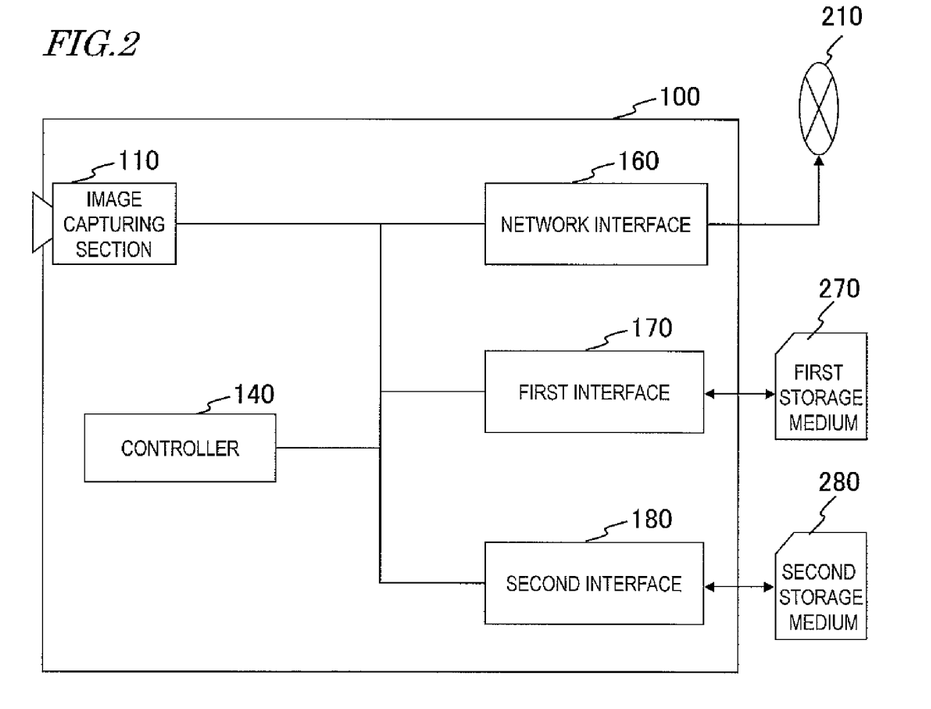
FIG. 2 is a block diagram illustrating a basic configuration for the image capture device.

FIG. 2 is a block diagram illustrating a basic configuration for the image capture device 100. The image capture device 100 includes an image capturing section 110 which generates video data by capturing an image, a first interface 170 which is connectable to a first storage medium 270, a second interface 180 which is connectable to a second storage medium 280, a network interface 160 which transmits and receives data by connecting itself to a network, and a controller 140 which controls writing the video data on the first and second storage media 270 and 280. The controller 140 controls writing the video data so that if the image capturing section's (110) image capturing session overlaps with transmission of the video data from the first storage medium 270 over the network 210 via the network interface 160, the video data that has been generated as a result of the image capturing session is written on the second storage medium 280.

By adopting such a configuration, if transmitting the video data that has been written on the first storage medium 270 and writing video data on the first storage medium 270 contend with each other, then the targets on which the video data is going to be written are changed into the second storage medium 280. As a result, even while video data is being transmitted, another video data can be newly, written.

Figure 3:
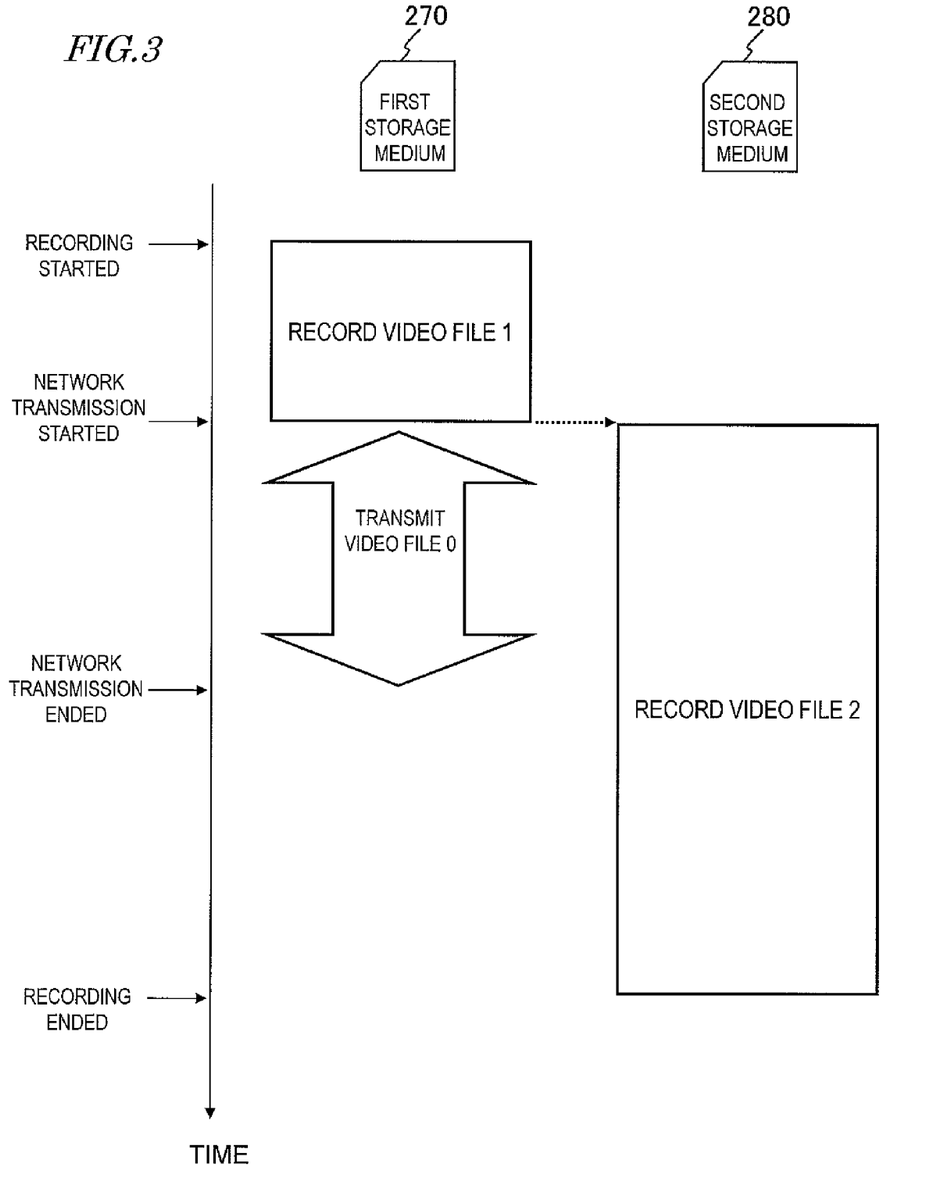
FIG. 3 illustrates how transmission and writing of video data may be controlled in the image capture device.

FIG. 3 shows timings for writing video data (video files) and transmitting them over the network on/from the first and second storage media 270 and 280. In this example, video file #0 that has already been written on the first storage medium 270 is supposed to start being transmitted while video file #1 is being written on the first storage medium 270. In response to an instruction to transmit the video file #0 that has already been written on the first storage medium 270 over the network 210 while video file #1 is being written on the first storage medium 270, the video file #1 stops being written and the video file #0 starts being transmitted. At that time, the controller 140 changes the targets to write the video data on from the first storage medium 270 into the second storage medium 280. As a result, video file #2 starts to be written on the second storage medium 280. In this case, the video files #1 and #2 are two files on which two sections of the same continuous video have been recorded separately. On those files, pieces of information indicating the previous and following video files may be stored. Then, those two separate video files can be played back as a series of video without losing its continuity.

In the example illustrated in FIG. 3, the video file #2 continues being written even after the network transmission has been done. However, the targets may be changed again into the first storage medium 270 once the network transmission is completed. In that case, when writing the video file #2 on the second storage medium 280 is finished, another video file starts to be written on the first storage medium 270. Also, even though the video file #2 is illustrated as a single file in the example shown in FIG. 3, the video data may also be written on two or more files separately. For example, if a video file is created in accordance with the FAT32 file system, video data with a size greater than 4 GB, which is the upper limit of a single file, is written on two or more files separately.

Figure 4:
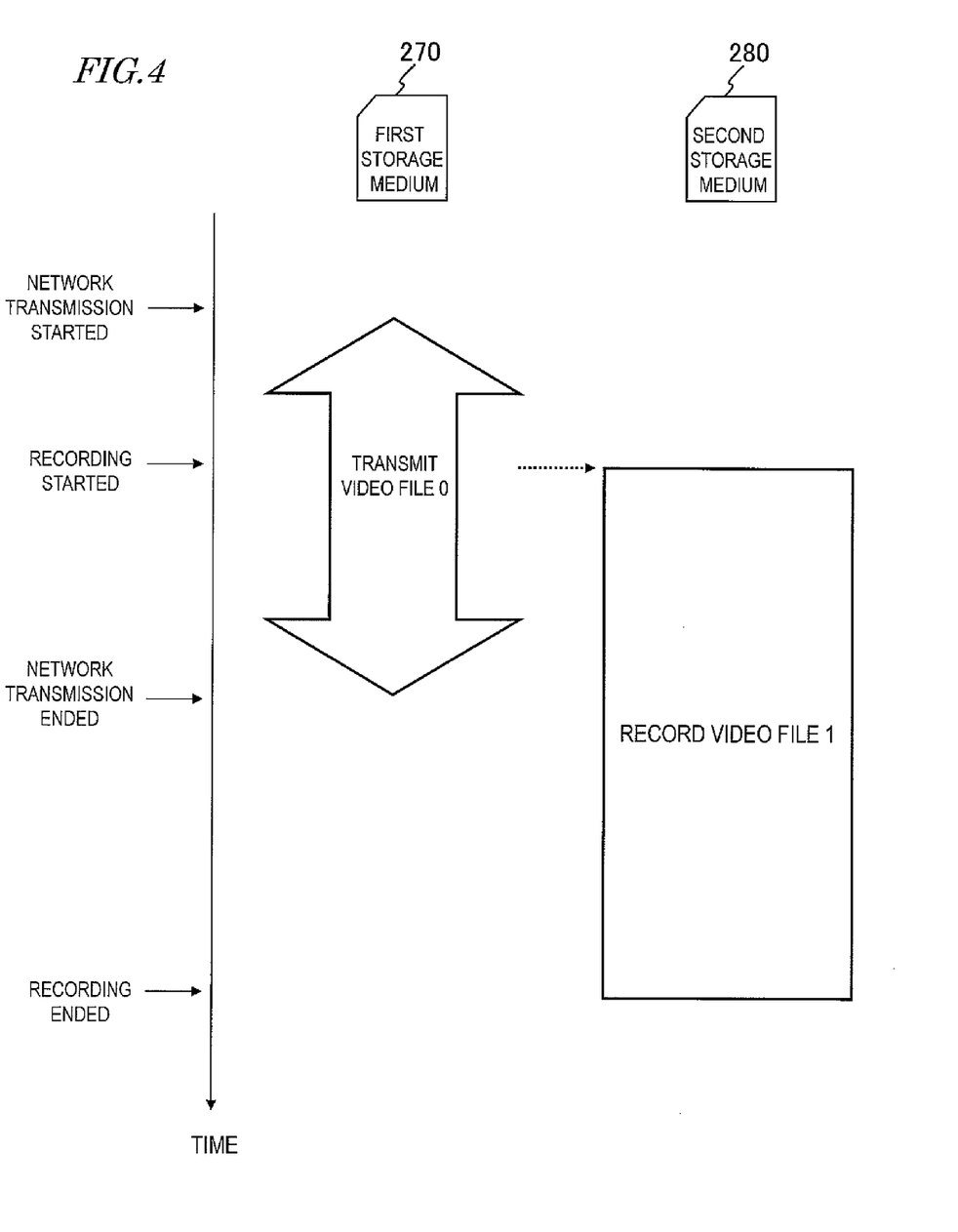
FIG. 4 illustrates how transmission and writing of video data may also be controlled in the image capture device.

FIG. 4 illustrates a situation where video data needs to be newly written on the first storage medium 270 while the video data that has been written on the first storage medium 270 is being transmitted over the network 210, contrary to the example described above. In this example, an instruction to start writing video data on the first storage medium 270 is supposed to be issued while video file #0 that has been written on the first storage medium 270 is being transmitted over the network 210. In that case, the controller 140 changes the targets to write the video data on from the first storage medium 270 specified originally into the second storage medium 280. As a result, while the network transmission from the first storage medium 270 continues, video file #1 starts to be written on the second storage medium 280. Consequently, even while video data is being transmitted, another video data can be newly written with the transmission continued, and therefore, the user never misses a golden opportunity to shoot an important scene. Even in this example, once the network transmission is completed, the targets may be changed into the first storage medium 270 again.

As can be seen, according to the technique of the present disclosure, even if transmitting video data and writing another video data contend with each other, the transmission and the write operation can be carried out in parallel by appropriately controlling the targets to write the video data on. As a result, even if inexpensive storage media with no simultaneous read/write capabilities are used, data can be transmitted while another data is being written, and vice versa. That is to say, the required performance is realized with the costs of the device cut down. It should be noted that the technique of the present disclosure is naturally applicable to writing video data on a high quality storage medium with simultaneous read/write capabilities, not just such a cheap storage medium with no simultaneous read/write capabilities at all.

Hereinafter, more specific embodiments will be described with reference to FIGS. 5 through 12.

Embodiment 1

First of all, an image capture device as a first embodiment will be described. An image capture device according to this embodiment includes two kinds of encoders with different compression rates and can write high-image-quality video data and low-image-quality video data simultaneously. In addition, the image capture device can also transmit those video data to a server or a storage device, which is provided at a distant broadcasting station or data center, over a network. In response to a transmission request from the broadcasting station during shooting (i.e., while video data is being written), the image capture device can transmit the high or low-image-quality video data that has already been written.

1-1. Configuration

Figure 5:
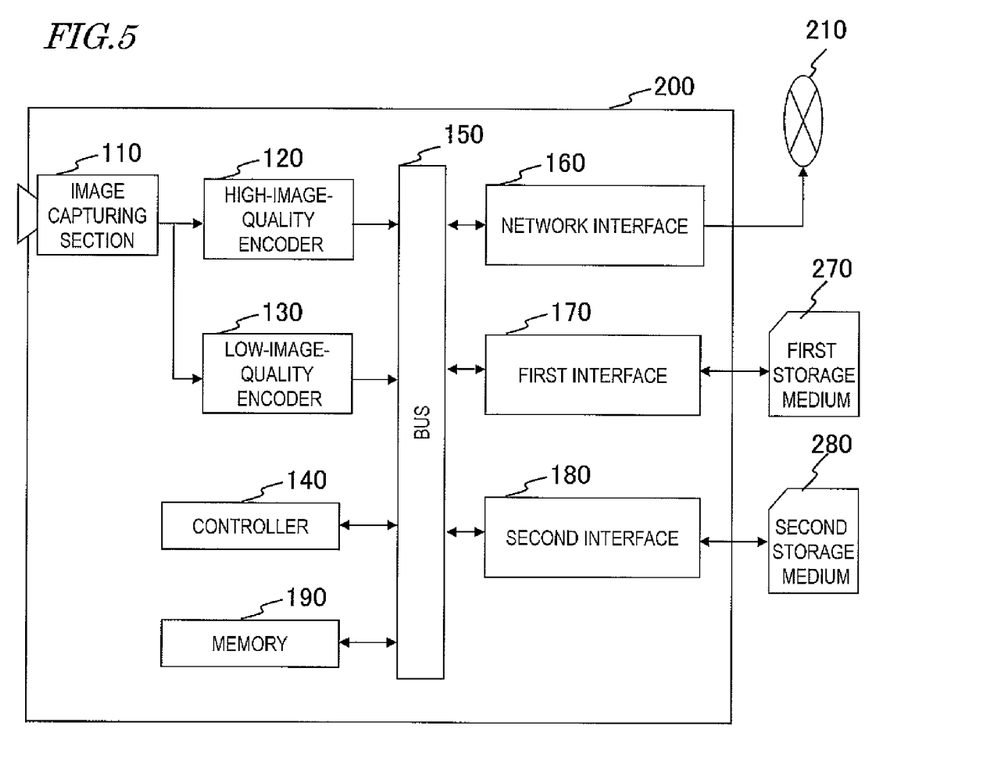
FIG. 5 is a block diagram illustrating a general configuration for an image capture device according to first and second embodiments.

FIG. 5 is a block diagram illustrating a configuration for an image capture device 200 according to this embodiment. The image capture device 200 includes an image capturing section 110, a high-image-quality encoder 120, a low-image-quality encoder 130, a controller 140, a bus 150, a network interface 160, a first interface 170, a second interface 180, and a memory 190. The first storage medium 270 may be electrically connected to the first interface 170, and the second storage medium 280 may be electrically connected to the second interface 180.

The image capturing section 110 includes an optical member such as a lens or an image sensor and is connected to the high-image-quality encoder 120 and the low-image-quality encoder 130. The high-image-quality encoder 120, the low-image-quality encoder 130, the controller 140, the network interface 160, the first interface 170, the second interface 180 and the memory 190 are all connected to the bus 150 and are configured to exchange electrical signals with each other.

The image capturing section 110 includes an optical system made up of multiple lenses, an image sensor which transforms the image that has been produced by the optical system into an electrical signal and outputs it, and a signal processing section which processes the electrical signal supplied from the image sensor and outputs it as a video signal. Specifically, the optical system may include a plurality of lenses such as a zoom lens, a focus lens, and an optical image stabilizer lens. The image sensor may be a known image sensor such as a CCD or a CMOS. The signal processing section may be implemented as a known digital signal processor.

The high-image-quality encoder 120 and the low-image-quality encoder 130 are circuits which encode the video signal supplied from the image capturing section 110, convert the video signal into high-image-quality data and low-image-quality data, respectively, and output them. In this description, these terms "high-image-quality" and "low-image-quality" just represent relative degrees of image quality, irrespective of their absolute image qualities. That is to say, one of two kinds of video data which has relatively high image quality will be referred to herein as a "high-image-quality" one, and the other video data which has relatively low image quality will be referred to herein as a "low-image-quality" one. That is why the high-image-quality encoder 120 encodes video data at a relatively low compression rate, thereby outputting the high-image-quality video data. On the other hand, the low-image-quality encoder 130 encodes video data at a relatively high compression rate, thereby outputting the low-image-quality video data.

The first and second storage media 270 and 280 may be general purpose memory cards, for example. The first and second interfaces 170 and 180 may be card slots which are configured to be connectable to the first and second storage media 270 and 280, respectively. However, the storage media do not have to be memory cards but may also be any other kind of storage media such as optical disks or magnetic disks.

The controller 140 is suitably implemented as a combination of hardware such as an integrated circuit and software such as a control program. The controller 140 may be a general-purpose microprocessor or a micro controller (or microcomputer). By carrying out the control program stored in the memory 190, the controller 140 performs the operations to be described later. It should be noted that the controller 140 may have any physical configuration as long as it is configured to perform the operations to be described later. For example, the controller 140 may be made up of only hardware. Also, the controller 140 may be either a single circuit component or a combination of multiple circuit components. Alternatively, the controller 140 and another member with a different function may be integrated together in a single component.

The network interface 160 may be a general-purpose network adapter and may be connected to an external network 210 either with a cable or wirelessly. The network interface 160 controls transmitting and receiving data to/from the external network 210.

The memory 190 may be a DRAM, a flash memory or a ferroelectric memory, for example. The memory 190 may store the control program described above, various kinds of data generated during the processing by the controller 140, and other data.

The bus 150 is composed of signal lines, through which signals are exchanged between blocks in this image capture device 200. Using this bus 150, video shot can be recorded on the storage media 270 and 280 and the data that has been written on the storage media 270 and 280 can be transmitted to an external device via the network interface 160.

It should be noted that this image capture device 200 may further include a microphone to record audio, a gyro sensor to perform optical image stabilization, a power supply, a flashlight and other known elements, in addition to the elements described above. However, since those additional elements have nothing to do with the essence of this embodiment, the description thereof will be omitted herein.

1-2. Operation

Next, it will be described how the image capture device 200 with such a configuration operates. A video signal that has been generated by the image capturing section 110 by capturing an image is compressed simultaneously by the high-image-quality encoder 120 and the low-image-quality encoder 130. The high-image-quality encoder 120 encodes the video signal either at a low compression rate or without compressing it at all. That is why the quantity of video data output from the high-image-quality encoder 120 per unit time becomes relatively large. On the other hand, the low-image-quality encoder 130 encodes the video signal at a relatively high compression rate. That is why the quantity of video data output from the low-image-quality encoder 130 per unit time becomes relatively small.

These two kinds of video data compressed are transferred to the first storage medium 270 by way of the bus 150 and the first interface 170, and eventually written as two separate files on the first storage medium 270. Specifically, the video data that has been compressed by the high-image-quality encoder 120 is written there as a high-image-quality video file, and the video data that has been compressed by the low-image-quality encoder 130 is written there as a low-image-quality video file. Even if recorded for the same amount of time, the high-image-quality video file comes to have a larger size and the low-image-quality video file comes to have a smaller size. In this example, the high-image-quality video file and the low-image-quality video file are supposed to be written on the first storage medium 270. However, these video files may also be written on the second storage medium 280. Alternatively, the high-image-quality video file and the low-image-quality video file may be written on two different storage media. Still alternatively, those video files may be written on the first storage medium 270 preferentially, but if the size of those two video files combined exceeds the remaining storage capacity of the first storage medium 270, then the remainder may be written on the second storage medium 280.

The controller 140 controls transfer of video data through the bus 150 and the operation of writing the video data as a file. If transmission of video data over the network 210 and writing another video data contend with each other for the same particular storage medium, the controller 140 performs a control to change the target storage media for writing.

By performing such an operation, every time the image capture device 200 shoots a video, the video shot is recorded as high- and low-image-quality video files on the storage media 270 or 280 one after another. As for audio data, on the other hand, audio data has a smaller data size, and affects the device less, than video data. Thus, description of audio recording will be omitted herein.

The network interface 160 connects this image capture device 200 to the network 210 either with a cable or wirelessly. As in the image capture device 100 shown in FIG. 1, the network interface 160 is connected to either a computer in the distant broadcasting station 220 or the server 230, which is installed at a different location from the broadcasting station 220, over the network 210.

If this image capture device 200 is used in an urgent application such as a breaking news report, the broadcasting station 220 can get, over the network 210, the video that has just been shot by the image capture device 200 on the spot. The server 230 may be a data storage device that can be accessed over the Internet and can save video files and other kinds of data over the network 210. Optionally, the server 230 may also have the function of allowing only authorized users to have access to those video files over the network 210.

Suppose a situation where the broadcasting station 220 needs to know exactly what kind of video the image capture device 200 has shot on the spot. Let us say the image capture device 200 on the spot has already gotten a video shot written as a low-image-quality video file with a smaller data size on the first storage medium 270 by the low-image-quality encoder 130 shown in FIG. 5.

In such a situation, the broadcasting station 220 accesses the image capture device 200 on the spot over the network 210 and requests the image capture device 200 to send the low-image-quality video file. In this case, a data access request is transmitted to the controller 140 via the network interface 160. In response to the request, the controller 140 retrieve the low-image-quality video file that has already been written on the first storage medium 270 and sends the file via the network interface 160 over the network 210. The low-image-quality video file has so small a data size as to be transferred completely in a short time over the network. In this manner, the broadcasting station 220 can obtain the low-image-quality video file, which forms part of the video that has been shot by the image capture device 200 on the spot, in a short time over the network 210 and can check out its contents.

Optionally, the image capture device 200 on the spot may be controlled to send the low-image-quality video file to the broadcasting station 220 every time the image capture device 200 shoots video. Such low-image-quality video files can be transferred in a short time over the network 210, and therefore, never interfere with shooting video newly. In that case, every time the image capture device 200 on the spot shoots new video, a low-image-quality video file is transferred to the broadcasting station 220. Consequently, low-image-quality video files that have been shot by the image capture device 220 on the spot are always retained in the broadcasting station 220, which allows the broadcasting station 220 to check out their contents any time.

Next, suppose a situation where the broadcasting station 220 has checked out the contents of the low-image-quality video files to find it necessary to get a high-image-quality video file for a particular part of the video. Such a situation occurs if the broadcasting station 220 has found some scenes to be actually broadcast in a news report program and wants to get their high-image-quality versions to be broadcast.

In that case, first, the broadcasting station 220 requests the image capture device 200 to send a high-image-quality video file over the network 210. Then, a data access request is transmitted to the controller 140 via the network interface 160. In this example, the data access request is supposed to be made for a video file that is stored on the first storage medium 270.

However, suppose the image capture device 100 is newly recording video when the request is received. That is to say, suppose the video data supplied from the high-image-quality encoder 120 and the low-image-quality encoder 130 through the bus 150 is being written on the first storage medium 270 at that time. If the first storage medium 270 were high performance storage medium with the simultaneous read/write capabilities, then the operation of writing video data newly and the operation of reading high-image-quality video data that has already been written could be performed simultaneously. However, the performance of the storage media 270 and 280 for use in this embodiment is not high enough to read and write video data simultaneously at a high bit rate to be handled by the image capture device 200. And if the storage media 270 and 280 should have such performance that is high enough to read and write video data simultaneously, then not just the storage media 270 and 280 but also the peripheral interfaces 170 and 180 and other hardware should have very high performance, thus increasing the cost of the device significantly.

Figure 6:
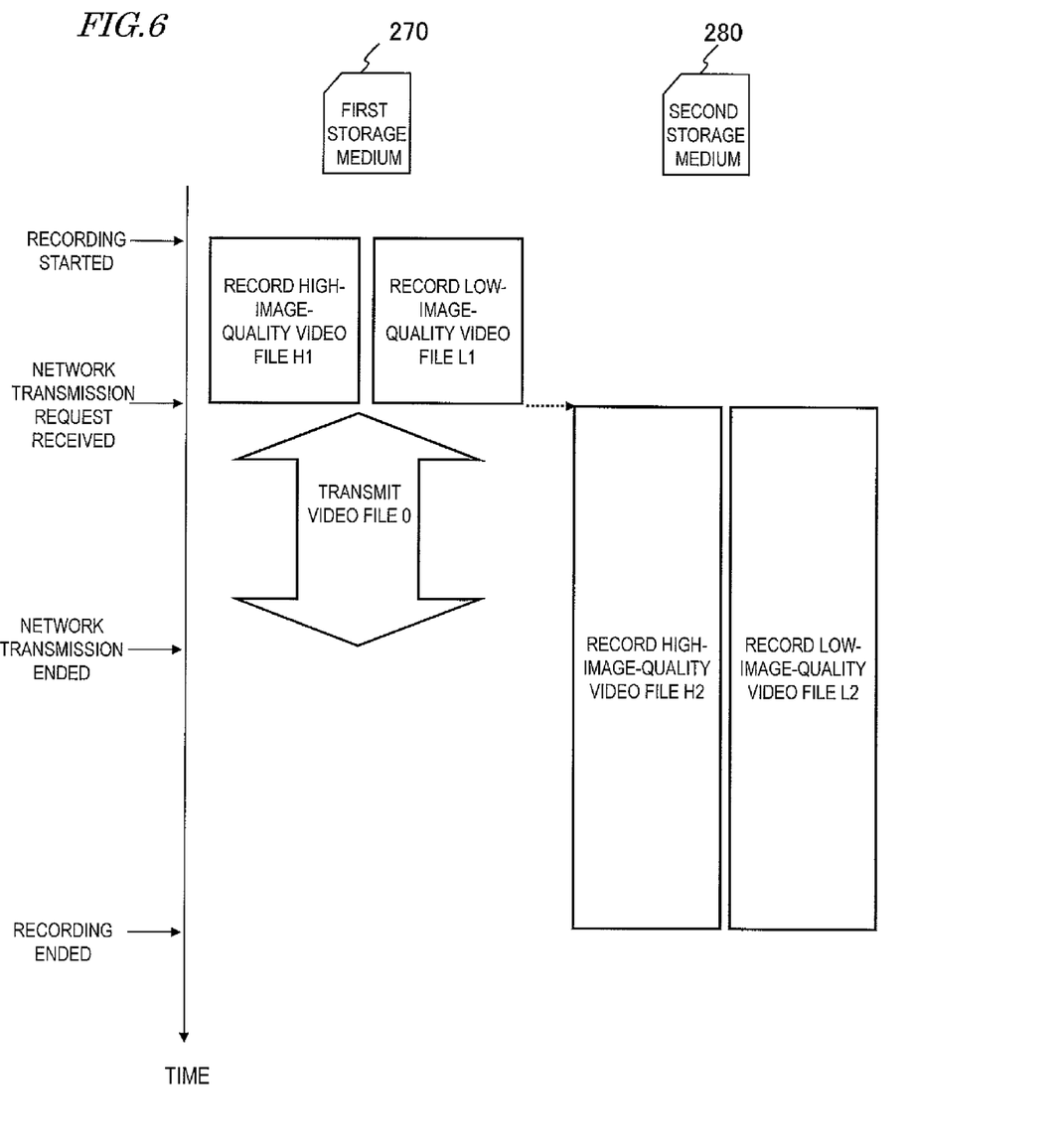
FIG. 6 illustrates how transmission and writing of video data may be controlled according to the first embodiment.

Thus, according to this embodiment, if the controller 140 senses that video data is being newly written on the storage medium for which the network transmission request has been made, then the controller 140 performs a control to change the target storage media while continuing the write operation. Specifically, as shown in FIG. 6, on receiving the network transmission request, the controller 140 once closes the high-image-quality video file H1 and the low-image-quality video file L1 that have been being recorded on the first storage medium 270. Next, the controller 140 opens a high-image-quality video file H2 and a low-image-quality video file L2 on the second storage medium 280 instead to resume recording the rest of the video. That is to say, the controller 140 changes the targets to write the video data on from the first storage medium 270 into the second storage medium 280.

Figure 7:
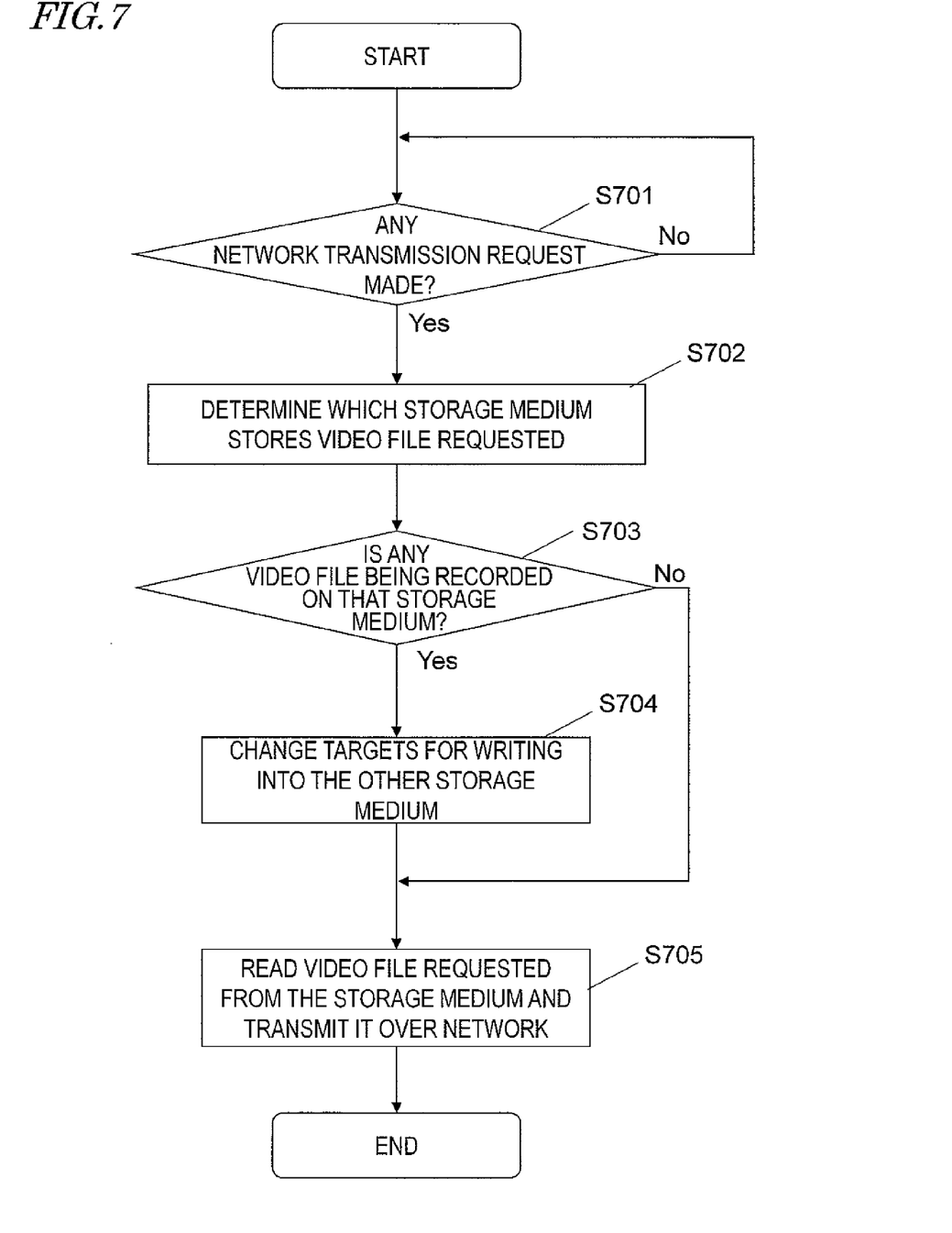
FIG. 7 is a flowchart showing the procedure of the processing to be carried out by the controller of the first embodiment.

FIG. 7 is a flowchart showing how the controller 140 operates in such a situation. The controller 140 always sees if any network transmission requests have been made (in Step S701). On sensing that a network transmission request has been received via the network interface 160, the controller 140 determines which storage medium store the high-image-quality video file requested (in Step S702). In this example, the controller 140 finds the high-image-quality video file requested on the first storage medium 270. Next, the controller 140 examines whether or not video is being newly recorded on the first storage medium 270 (in Step S703). If the answer is YES, then the controller 140 changes the targets for writing as described above from the first storage medium 270 into the other storage medium, i.e., the second storage medium 280 (in Step S704). After that, the controller 140 accesses the first storage medium 270 on which the write operation is no longer being performed, retrieves the high-image-quality video file requested via the network interface 160 from the first storage medium 270, and then transmits the file via the network interface 160 over the network 210 (in Step S705). If the controller 140 has determined in Step S703 that no write operation is being performed on the storage medium that stores the video file requested, then the controller 140 skips the processing step S704 and performs the processing step S705.

By performing these processing steps, even if the image capture device 200 on the spot is performing a write operation, the broadcasting station 220 can also get high-image-quality video data from the image capture device 200 on the spot over the network 210. In the example described above, high-image-quality video data is supposed to be transmitted. However, the control operation described above may also be performed even when low-image-quality video data needs to be transmitted. Also, in the example described above, writing and transmission of video data are supposed to contend with each other for the first storage medium 270. However, quite the same control is applicable to the second storage medium 280, too.

1-3. Effects

By performing such a control, video data will never be read and written simultaneously from/on any of the first and second storage media 270 and 280. That is why as none of these storage media have to have the capability of reading and writing data simultaneously, the costs of the storage media 270 and 280 and the peripheral hardware can be cut down.

In addition, even if the image capture device 200 on the spot is recording new video, the broadcasting station 220 can still get high-image-quality video, thus providing a more convenient tool for users.

Embodiment 2

Hereinafter, an image capture device as a second embodiment will be described. In the first embodiment, it has been described how to make an image capture device which is able to perform a write operation during transmitting a high-image-quality video file over the network that has already been recorded on the same storage media. In this second embodiment, it will be described how to make an image capture device which is transmitting a high-image-quality video file over the network that has already been recorded newly start a write operation to the contrary.

2-1. Configuration

The image capture device of this embodiment has the same physical configuration as the one illustrated in FIG. 5. Thus, description of its components will be omitted herein. In this embodiment, however, the processing carried out by the controller 140 is different from that of the first embodiment.

2-2. Operation

Hereinafter, it will be described how the image capture device 200 of this embodiment operates. In this embodiment, the image capture device 200 is also connected to the broadcasting station 220 and the server 230 over the network 210 as in the configuration shown in FIG. 1. In the following description, the broadcasting station 220 is supposed to have requested the image capture device 200 that is idling on the spot, i.e., performing neither a write operation nor a read operation, to send high-image-quality video data over the network 210. In this example, the high-image-quality video data is also supposed to be stored on the first storage medium 270.

In that case, a data access request is transmitted to the image capture device 200 via the network interface 160. In this embodiment, the controller 140 also operates following the flow shown in FIG. 7. Specifically, the controller 140 always sees if any network transmission requests have been made (in Step S701). On sensing that a network transmission request has been received via the network interface 160, the controller 140 determines which storage medium stores the high-image-quality video file requested (in Step S702). In this example, the controller 140 finds the high-image-quality video file requested on the first storage medium 270. Next, the controller 140 examines whether or not video is being newly recorded on the first storage medium 270 (in Step S703). Since neither a write operation nor a read operation is currently being performed on the first storage medium 270, the controller 140 accesses the first storage medium 270, retrieves the high-image-quality video file requested via the network interface 160 from the first storage medium 270, and then transmits the file via the network interface 160 over the network 210 (in Step S705).

A high-image-quality video file has such a huge data size that it takes a long time to transmit it completely over the network. Suppose the image capture device on the spot has to start recording video newly in the meantime. If the image capture device 200 is still transmitting the high-image-quality video file over the network, the processing of reading video data from the first storage medium 270 that stores the high-image-quality video file is still being carried on. In such a situation, the controller 140 controls the image capture device 200 so that the write operation will be newly started on the other storage medium, i.e., the second storage medium 280, not the first storage medium 270 from which video data is being read now.

Figure 8:
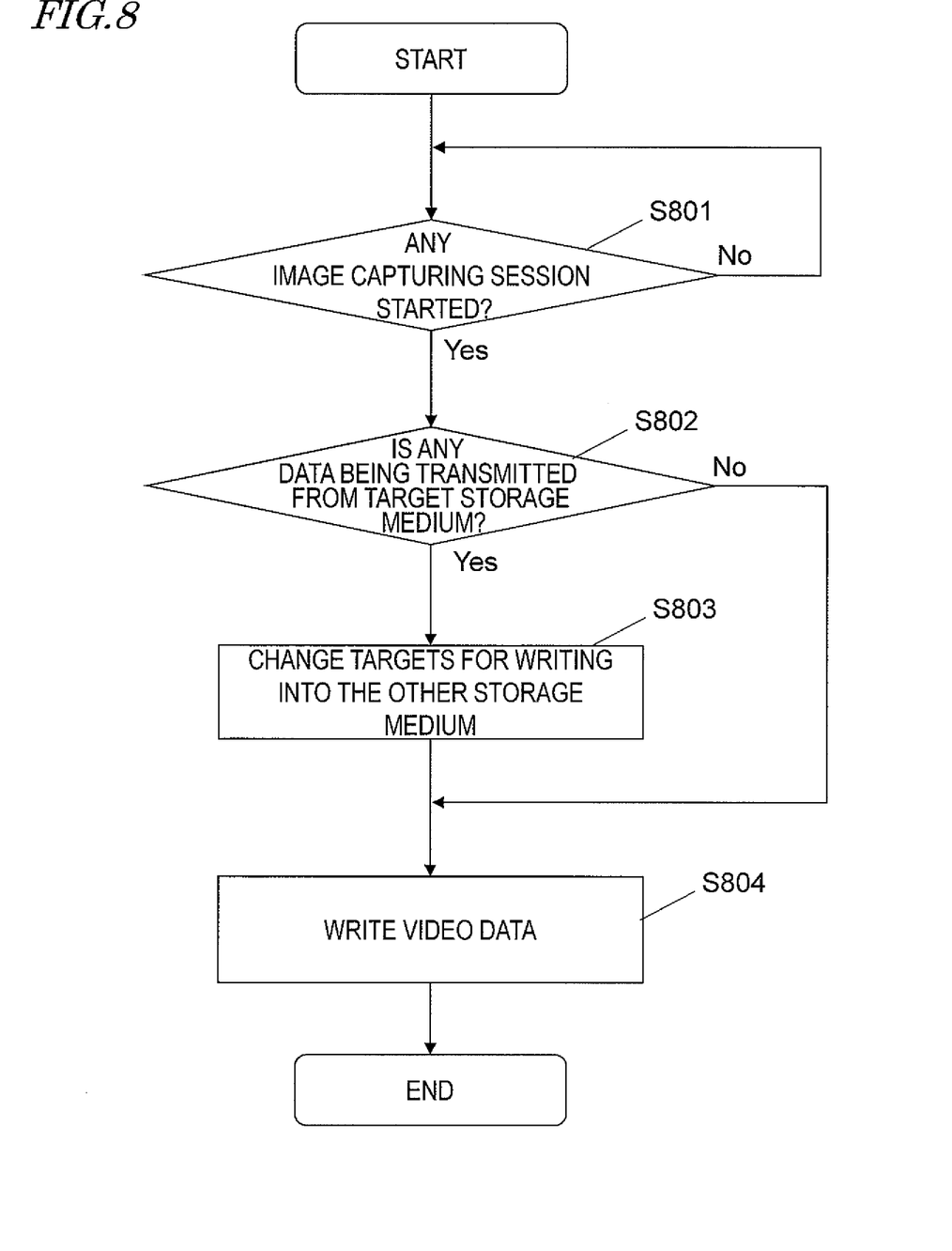
FIG. 8 is a flowchart showing the procedure of the processing to be carried out by the controller of the second embodiment.

FIG. 8 is a flowchart showing how the controller 140 may operate in such a situation. The controller 140 always sees if any image capturing session has been started (in Step S801).

If the user presses a shooting start button, for example, an image capturing session is started. On sensing that an image capturing session has been started, the controller 140 examines whether or not data is currently being transmitted from the first storage medium 270 on which the video data is to be written (in Step S802). Since video data is currently being read from the first storage medium 270 in this example, the controller 140 changes the targets to write the video data on from the first storage medium 270 into the second storage medium 280 (in Step S803). After that, the video data is written on the second storage medium 280 (in Step S804). If it has turned out in Step S802 that no data is currently being read from the storage medium on which video data is to be written (e.g., the first storage medium 270 in this example), then the process advances to Step S804 in which the video data is written on that storage medium.

Once the image capture device 200 has started the write operation, the video signal that has been generated by the image capturing section 110 is compressed simultaneously by the high-image-quality encoder 120 and the low-image-quality encoder 130. Then, the two kinds of compressed video data is transferred to the second storage medium 280 through the bus 150 and written separately as a high-image-quality video file and a low-image-quality video file, respectively.

The controller 140 controls transfer of video data to write through the bus 150 and the operation of writing the video data as a file. In the meantime, the controller 140 continues to perform the operation of reading the high-image-quality video file from the first storage medium 270 and transmitting the file via the network interface 160 over the network. As a result, the image capture device 200 can record video newly while transmitting high-image-quality video over the network.

2-3. Effects

By performing such a control, data will never be read and written simultaneously from/on any of the first and second storage media 270 and 280. That is why as none of these storage media have to have the capability of reading and writing data simultaneously, the costs of the storage media 270 and 280 and the peripheral hardware can be cut down.

In addition, the user of the image capture device 200 on the spot can start an image capturing session anytime without sensing which of the two storage media in the image capture device 200 the broadcasting station 220 is accessing over the network 210 to read high-image-quality video data from it, thus providing a more convenient tool for users.

Embodiment 3

Next, a third embodiment will be described. In the first and second embodiments described above, the broadcasting station is supposed to request the image capture device on the spot to send a high-image-quality video file over the network. In this third embodiment, on the other hand, the camera on the spot designates a high-image-quality video file to transmit from the spot and sends it. In this embodiment, the network architecture is also as shown in FIG. 1.

3-1. Configuration

Figure 9:
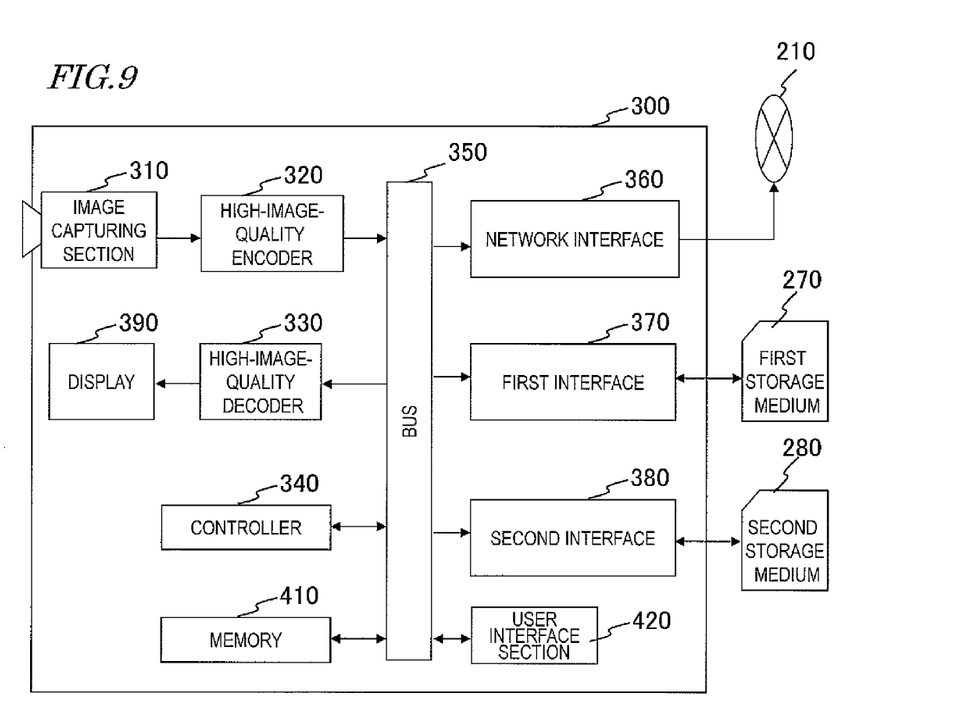
FIG. 9 is a block diagram illustrating a general configuration for an image capture device according to third embodiment.

FIG. 9 is a block diagram illustrating a general configuration for an image capture device 300 according to this third embodiment. As shown in FIG. 9, the image capture device 300 includes an image capturing section 310, a high-image-quality encoder 320, a high-image-quality decoder 330, a controller 340, a bus 350, a network interface 360, a first interface 370, a second interface 380, a display 390, a memory 410 and a user interface section 420. The image capturing section 310 includes an optical member such as a lens or a sensor and is connected to the high-image-quality encoder 320. The memory 410, the user interface section 420, high-image-quality encoder 320, the high-image-quality decoder 330, the controller 340, the network interface 360, the first interface 370, and the second interface 380 are all connected to the bus 350. Even though the low-image-quality encoder that has been described for the first embodiment is omitted from FIG. 8 for the sake of simplicity, a low-image-quality encoder may also be provided in this embodiment.

The high-image-quality decoder 330 is a circuit which decodes high-image-quality video data that has been encoded and written on a storage medium and outputs it to the display 390 during a read operation. The display 390 may be a liquid crystal display or an organic EL display, for example, and displays the video that has been decoded by the high-image-quality decoder 330. The user interface section 420 may be a button, a lever or any other member that accepts the user's instruction. Optionally, the user interface section 420 may include a touchscreen panel which forms an integral part of the display 390. By operating the user interface section 420, the user can instruct when to start and end an image capturing session and when to start and end a playback operation, and can also enter various other settings. Since the components other than the high-image-quality decoder 330, the display 390 and the user interface section 420 have the same physical configurations as their counterparts of the first and second embodiments, description thereof will be omitted herein.

3-2. Operation

Now it will be described how the image capture device 300 of this embodiment with such a configuration operates. In this embodiment, video data is also supposed to be written on the first storage medium 270. A video signal that has been generated by the image capturing section 310 is compressed by the high-image-quality encoder 320. The compressed video data is then transferred to the first storage medium 270 through the bus 350 and the first interface 370 and written there as a high-image-quality video file. The controller 340 controls transfer of the video data through the bus 350 and the operation of writing the video data as a file.

The image capture device 300 includes the high-image-quality decoder 330 and the display 390 to play back video. In playing back the video that has been recorded as a file on the first storage medium 270, the video file is read by the controller 340 and transferred to the high-image-quality decoder 330 through the bus 350. In response, the high-image-quality decoder 330 expands the compressed video data and outputs it to the display 390. As a result, the video is presented on the display 390. Video that has been recorded on the second storage medium 280 can also be presented on the display 390 in the same way. In this manner, the image capture device 300 can play back the video recorded.

Suppose a situation where the user, who is monitoring on the spot the video being played back on the image capture device 300, has decided to transmit a particular scene to either the broadcasting station 220 or the server 230 over the network. Such a situation arises when the personnel of a news report program have shot a scene on the spot and found it important enough to transmit it to either the TV station or the server.

The image capture device 300 includes the network interface 360 and can transmit and receive data by being connected to the network 210 either with a cable or wirelessly. In this embodiment, the personnel on the spot who have shot video decide what part of the video should be transmitted to make the image capture device 300 transmit that part of the video to either the broadcasting station 220 or the server 230 over the network 210.

As described above, the image capture device 300 shown in FIG. 9 includes the high-image-quality decoder 330 and display 390 to play back the video recorded. Thus, while monitoring the recorded video on the display 390, the user of this image capture device 300 can specify any arbitrary points of the video being played back as a starting point and an end point, respectively, using the user interface section 420. And the user can add that part of the video between the starting and end points specified to a list of video clips to transmit over the network (which will be referred to herein as a "transmission list"). These pieces of information about the video part chosen and the starting and end points specified are retained as the transmission list in the memory 410 of the image capture device 300.

Figure 10:
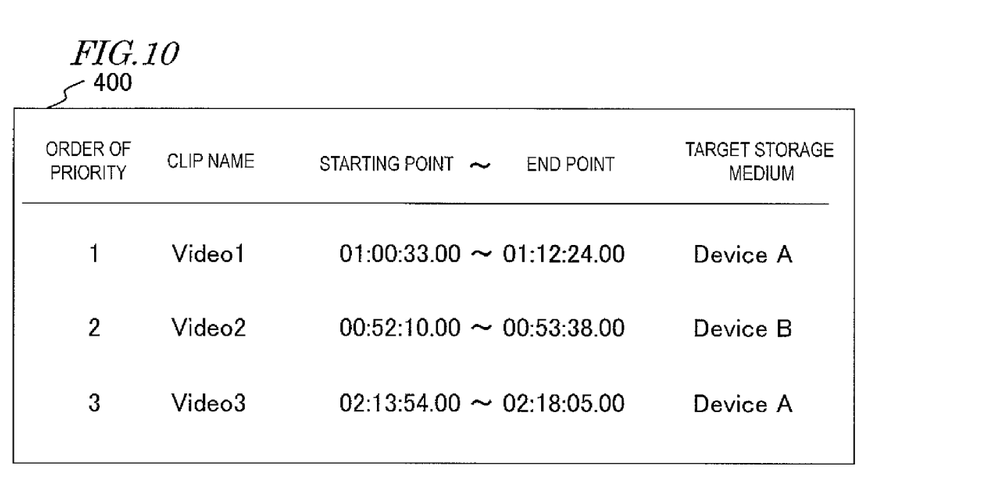
FIG. 10 shows an example of a transmission list to manage the order of transmission of video files according to the third embodiment.

FIG. 10 shows an example of a transmission list 400 for use so as to manage the order of transmission of video clips or files. In the transmission list 400, parts of the video files that are stored on the first and second storage media 270 and 280 loaded into the image capture device 300 shown in FIG. 9 and that need to be transmitted over the network are compiled as a list. More specifically, the contents to be described on the transmission list 400 include the names of clips or files to identify the video, the starting and end points of the video parts to transmit, and identification information of the storage media on which the video is stored. The transmission list 400 may include multiple pieces of information about the clips to transmit along with pieces of information about the order of priority. In accordance with the user's instruction or following a predetermined transmission schedule, the controller 340 shown in FIG. 9 sequentially transmits, over the network 210, the video clips or files in the order of priority specified on the transmission list 400 shown in FIG. 10.

In the image capture device 300 shown in FIG. 9, the transmission list is stored in the memory 410. Following the order of priority specified on the transmission list 400 shown in FIG. 10, the controller 340 starts the processing of transmitting a video clip with the name "Video 1" and with the order of priority #1. According to the transmission list 400, the video clip "Video 1" is stored on the storage medium "Device A", which is supposed to be the first storage medium 270 shown in FIG. 9 in this example. The controller 340 accesses the first storage medium 270 and transfers that part of the video data between the starting and end points specified on the list to the network interface 360 through the bus 350 while reading the video data from the file with the clip name "Video 1". In response, the network interface 360 transmits the video data to either the broadcasting station 220 or the server 230 over the network 210.

In this example, the video data being transmitted is high-image-quality video data, which has so large a data size that it may take a lot of time to transmit the video data completely over the network 210. In the meantime, the image capture device 300 shown in FIG. 9 may need to record video newly. In that case, the control that has already been described for the second embodiment, i.e., starting to record video newly on the other storage medium 280, is carried out.

Figure 11:
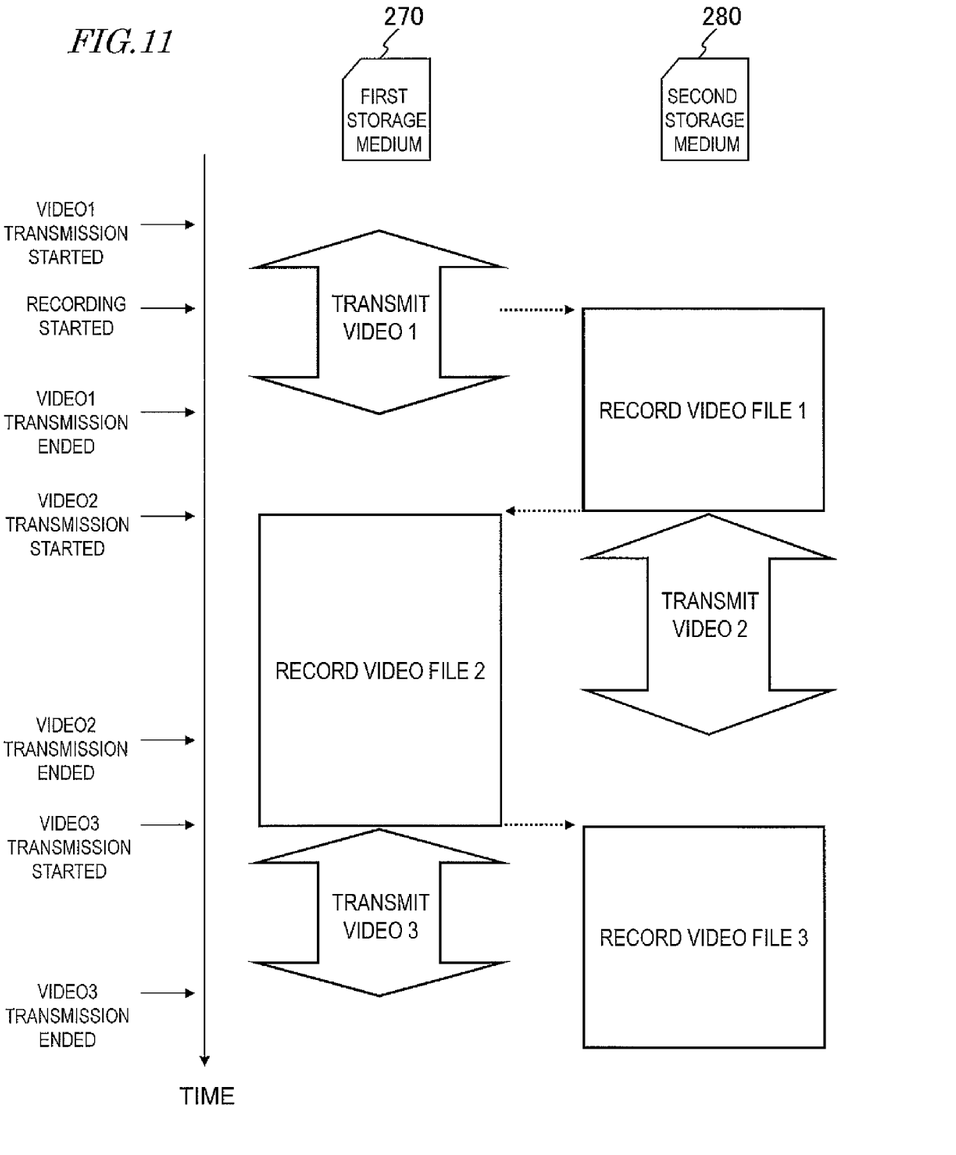
FIG. 11 illustrates how transmission and writing of video data may be controlled according to the third embodiment.

FIG. 11 shows an exemplary writing control according to this embodiment. During the network transmission, high-image-quality video data (Video 1) is read from the first storage medium 270. Thus, the controller 340 writes the video data (Video File 1) on the second storage medium 280 that is the other storage medium. In this manner, the image capture device 300 can perform the operation of reading high-image-quality video data from the first storage medium 270 and transmitting it via the network interface 360 and the other operation of getting the video signal that has been supplied from the image capturing section 310, compressing it by the high-image-quality encoder 320 and writing it on the second storage medium 280 simultaneously.

When the video with the clip name "Video 1" shown in FIG. 10 is transmitted completely over the network, the controller 340 will start the processing of transmitting the video with the clip name "Video 2" and with the order of priority #2 on the transmission list 400 shown in FIG. 10. According to the transmission list 400, the video clip "Video 2" is stored on the storage medium "Device B", which is supposed to be the second storage medium 280 shown in FIG. 9 in this example.

However, Video File 1 that is the new video data is currently being recorded on the second storage medium 280. In that case, the control that has already been described for the first embodiment, i.e., changing the targets for writing into the other storage medium (i.e., the first storage medium 270 in this case), is carried out.

At this point in time, the image capture device 300 is recording Video File 1 on the second storage medium 280. Thus, the controller 340 once closes the high-image-quality Video File 1 that has been being recorded on the second storage medium 280 and opens high-image-quality Video File 2 on the first storage medium 270 instead to resume recording the rest of the video. That is to say, the controller 340 changes the targets to write the video data on from the second storage medium 280 into the first storage medium 270.

Then, the controller 340 performs the processing of transmitting the video with the clip name "Video 2" and with the order of priority #2 on the transmission list 400 shown in FIG. 10. The controller 340 shown in FIG. 9 accesses the second storage medium 280 on which the write operation is no longer being performed, finds a file identified by the clip name "Video 2", reads video data between the starting and end points specified on the list, and transfers the video data to the network interface 360 through the bus 350. In response, the network interface 360 transmits the video data to either the broadcasting station 220 or the server 230 over the network 210.

As can be seen, if the video data to transmit over the network 210 is stored on the storage medium under recording, then the targets for writing can be changed with each other. In this manner, the image capture device can transmit the video data over the network following the order of priority specified on the transmission list with the write operation continued.

After that, transmission of data over the network following the order of priority specified on the list and change of the storage media as targets for writing will be performed alternately in a similar manner.

When the video with the clip name "Video 2" is transmitted completely over the network 210, the controller 340 will start the processing of transmitting the video with the clip name "Video 3" and with the order of priority #3 on the transmission list 400 shown in FIG. 10. According to the transmission list 400, the video clip "Video 3" is stored on the storage medium "Device A", which is the first storage medium 270. However, video data is current being written on the first storage medium 270. Thus, the controller 340 once closes the high-image-quality Video File 2 that has been being recorded on the first storage medium 270 and opens high-image-quality Video File 3 on the second storage medium 280 instead to resume recording the rest of the video. That is to say, the controller 340 changes the targets to write the video data on from the first storage medium 270 into the second storage medium 280.

Then, the controller 340 performs the processing of transmitting the video with the clip name "Video 3" and with the order of priority #3 on the transmission list 400 shown in FIG. 10. The controller 340 accesses the first storage medium 270 on which the write operation is no longer being performed, finds a file identified by the clip name "Video 3", reads video data between the starting and end points specified on the list, and transfers the video data to the network interface 360 through the bus 350. In response, the network interface 360 transmits the video data to either the broadcasting station 220 or the server 230 over the network 210.

3-3. Effects

As described above, according to this embodiment, the user of the image capture device 300 on the spot can choose any part of the video to transmit and get it transmitted over the network. And while the video is being transmitted, the image capture device 300 can start recording video newly. If the video to be transmitted over the network is stored on a storage medium under recording, then the targets for writing are changed with each other. As a result, transmission of video over the network can be continued with recording of another video continued, thus providing more convenient tools for the user. On top of that, each of the storage media is controlled so as not to read and write video from/on it simultaneously. That is why the storage medium does not have to have the simultaneous read/write capabilities and can have its cost cut down.

Other Embodiments

Although first through third embodiments of an image capture device have been described herein as just an example of the present disclosure, various modifications, replacements, additions or omissions can be readily made on those embodiments as needed and the present disclosure is intended to cover all of those variations. Also, a new embodiment can also be created by combining respective elements that have been described for those first through third embodiments disclosed herein.

Hereinafter, some other embodiments will be described as an example.

In the third embodiment described above, on the transmission list 400 shown in FIG. 10, the starting and end points of the video part to transmit are supposed to be set by time code indication. However, this is only an example. Alternatively, byte locations of a file including the video to transmit or even the entire file on target may be specified as well.

Also, in the third embodiment described above, video is played back by operating the image capture device 300 shown in FIG. 9 to compile the transmission list 400 shown in FIG. 10. Alternatively, the transmission list 400 may also be made and sent to the image capture device 300 by the broadcasting station 220 or by another terminal that can be connected to the image capture device 300. In that case, the transmission list 400 does not have to include information about the storage medium that stores video. Also, information indicating the destinations does not have to be the transmission list shown in FIG. 10 but may also be any other kind of information as long as it can be used to identify the video data to be transmitted over the network.

The network interface of the image capture devices that have been described for the first, second and third embodiments may be compatible with a wired network such as Ethernet™ or USB or a wireless network such as wireless LAN, WiMAX™ or a cellular phone network. Optionally, a new wired or wireless network to be developed in the future will also be able to be used.

The storage media that have been described for the first, second and third embodiments may be any kind of storage media like memory media or disc media. Also, the same effect can also be achieved even by using multiple different kinds of storage media such as a memory medium and a disc medium in combination.

Furthermore, even though two storage media are supposed to be connected to the image capture, devices that have been described for the first through third embodiments, each of those image capture devices may also be configured to be connected to three or more storage media. In that case, the control operation described above is performed to change the target storage media to write video data on when writing video data on any of the storage media overlaps with transmission of another video data from the same storage medium.

Figure 12:
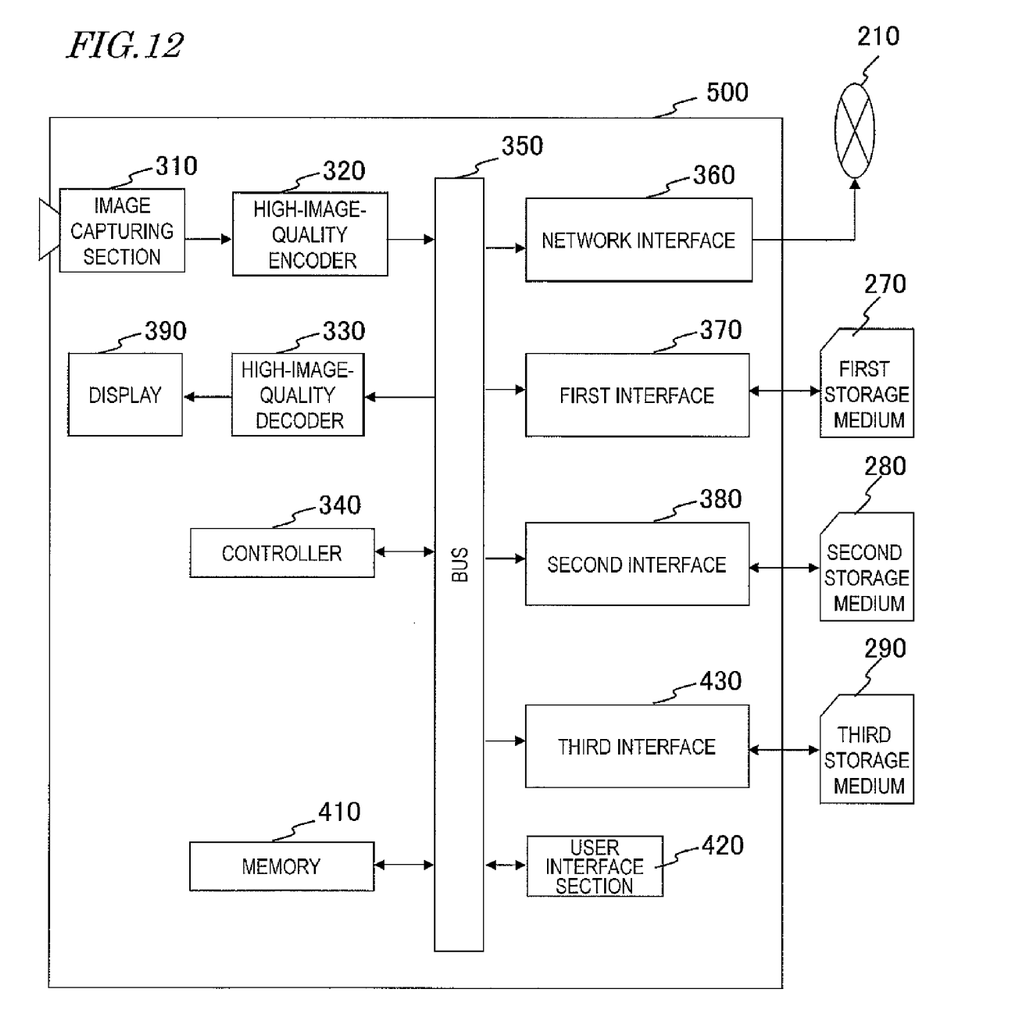
FIG. 12 is a block diagram illustrating a general configuration for an image capture device according to an alternative embodiment.

FIG. 12 is a block diagram illustrating a configuration for an image capture device 500 which can be connected to three storage media as an example. The image capture device 500 includes not only every component of the image capture device 300 of the third embodiment described above but also a third interface 430 as well, and is configured to be connected to a third storage medium 290. In this example, the controller 340 is configured to control the targets to write video data on appropriately so as to avoid writing video data on any of the first, second and third storage media 270, 280 and 290 while reading another video data from the same storage medium, or vice versa. For example, if video data needs to be written on the first storage medium 270 while another video data is being read from it, then the controller 340 changes the targets so that the former video data is written on the second storage medium 280 instead. And if video data needs to be written on the second storage medium 280 while another video data is being read from it, then the controller 340 changes the targets so that the former video data is written on the third storage medium 290 instead. Then, reading and writing operations will not contend with each other on the same storage medium, and therefore, an image capturing session and a network transmission can be carried out in parallel even without using any storage medium with the simultaneous read/write capabilities.

Various embodiments of the present disclosure have been described by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the present disclosure. Therefore, please do not make a superficial decision that those inessential additional elements are indispensable ones simply because they are illustrated or mentioned on the drawings or the description.

Also, the embodiments disclosed herein are just an example of the present disclosure, and therefore, can be subjected to various modifications, replacements, additions or omissions as long as those variations fall within the scope of the present disclosure as defined by the appended claims and can be called equivalents.

The technique of the present disclosure can be used to allow an image capture device with a network capability to perform the operation of recording video and the operation of transmitting another video over a network simultaneously.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-052663 filed Mar. 9, 2012, and No. 2012-226662 filed Oct. 12, 2012, the entire contents of which are hereby incorporated by reference.

What is claimed is:

1. An image capture device comprising:
   an image capturing section configured to generate video data by performing an image capturing session;
   a first interface that is connectable to a first storage medium;
   a second interface that is connectable to a second storage medium;
   a network interface configured to transmit and receive data by connecting itself to a network; and
   a controller configured to
   write first video data generated by the image capturing section on the first storage medium,
   receive an instruction to transmit other second video data previously stored on the first storage medium over the network via the network interface,
   judge when the instruction to transmit the other second video data overlaps with the writing of the first video data on the first storage medium, and
   change, when judging the instruction to transmit the other second video data overlaps with the writing of the first video data, the writing target for the first video data from the first storage medium to the second storage medium.

2. The image capture device of claim 1, wherein the controller is further configured to determine if the image capturing section newly starts an image capturing session while the other second video data is being transmitted over the network and write video data generated as a result of the new image capturing session on the second storage medium.

3. The image capture device of claim 1, wherein the video data has parts, the image capture device further comprising a memory that stores information indicating which of the parts of the video data that has been generated by the image capturing section needs to be transmitted via the network interface over the network,
   wherein the controller determines, by reference to that information, which of the parts of the video data needs to be transmitted over the network.

4. The image capture device of claim 3, further comprising a user interface section that allows a user to set that information.

5. The image capture device of claim 3, wherein that information is entered from another device via the network interface.

6. The image capture device of claim 1, wherein the controller controls writing the video data so that when an image capturing session by the image capturing section overlaps with transmission of the video data from the second storage medium over the network via the network interface, the video data that has been generated as a result of the image capturing session is written on the first storage medium.

7. The image capture device of claim 1, further comprising a third interface that is connectable to a third storage medium,
   wherein the controller controls writing the video data so that when an image capturing session by the image capturing section overlaps with transmission of the video data from the second storage medium over the network via the network interface, the video data that has been generated as a result of the image capturing session is written on the third storage medium.

8. A non-transitory computer-readable medium storing a computer program to be executed by a computer embedded in an image capture device, the device comprising: an image capturing section configured to generate video data by performing an image capturing session; a first interface that is connectable to a first storage medium; a second interface that is connectable to a second storage medium; a network interface configured to transmit and receive data by connecting itself to a network; and a controller configured to control writing the video data on the first and second storage media,
   the program causing the computer embedded in the controller to
   write first video data generated by the image capturing section on the first storage medium,
   receive an instruction to transmit other second video data previously stored on the first storage medium over the network via the network interface,
   judge when the instruction to transmit the other second video data overlaps with the writing of the first video data on the first storage medium, and
   change, when judging the instruction to transmit the other second video data overlaps with the writing of the first video data, the writing target for the first video data from the first storage medium to the second storage medium.

* * * * *